March 18, 1941. M. H. ROBERTS 2,235,409
LOCOMOTIVE DRIVING BOX LUBRICATOR EQUIPMENT
Filed Dec. 29, 1938 3 Sheets-Sheet 1

INVENTOR
Montague H. Roberts
BY
Barnes West & Sechrest
ATTORNEYS

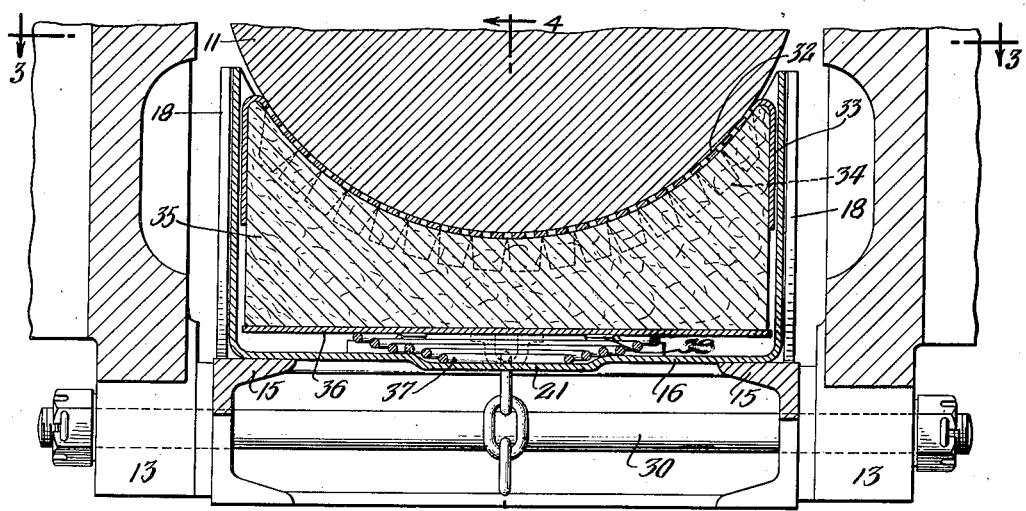
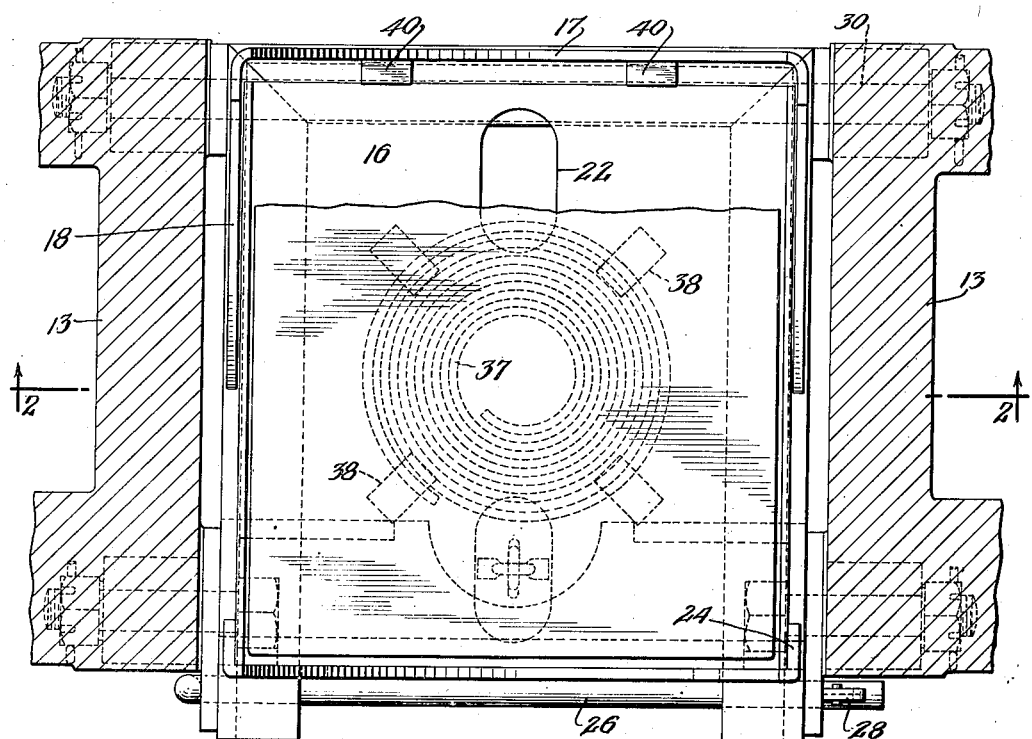

March 18, 1941.  M. H. ROBERTS  2,235,409
LOCOMOTIVE DRIVING BOX LUBRICATOR EQUIPMENT
Filed Dec. 29, 1938  3 Sheets-Sheet 3

INVENTOR
Montague H. Roberts
BY
ATTORNEYS

Patented Mar. 18, 1941

2,235,409

UNITED STATES PATENT OFFICE 2,235,409

LOCOMOTIVE DRIVING BOX LUBRICATOR EQUIPMENT

Montague H. Roberts, Englewood, N. J., assignor to Franklin Railway Supply Company, New York, N. Y., a corporation of Delaware Application December 29, 1938, Serial No. 248,214

5 Claims. (Cl. 308—83)

This invention relates to lubricators for the driving boxes of locomotive axles, and is particularly applicable to that well known type of lubricator which involves the use of a perforated plate in contact with the journal beneath which is a grease cake constantly urged toward the journal by means of a suitable spring and follower plate.

The principal objects of the invention are the following:

(1) The provision of lubricator equipment which is very much lighter in weight without sacrifice of strength. This is a very important advantage particularly in modern high speed locomotives where reduction of unsprung weight is of very great importance.

(2) The provision of a lubricator equipment in which the heat developed as a result of operation is much more uniformly and adequately dissipated without however interfering with the necessary melting of the grease at the surface of the journal. As an incident to this object it is also an object of this invention to avoid unnecessary waste of lubricant by preventing melting of the grease cake to a depth greater than is necessary to effect adequate lubrication of the journal.

(3) The provision of a construction which permits the use of the largest possible grease cake and one which ensures more positive and adequate lubrication of the wheel hub than has heretofore been possible.

(4) The provision of a lubricant cellar which is reversible.

(5) The provision of a cellar and guiding or positioning means therefor which can be made or stamped from rolled steel stock in order to greatly improve the uniformity and strength of the parts while at the same time greatly decreasing their weight.

(6) The provision of a cellar and end plate which can be stamped in one operation from a single piece of sheet stock, whereby the cost of manufacture is greatly reduced and more uniform and accurate clearances are made possible.

(7) The provision of a cellar in which the corners are so constructed as to better retain the lubricant while at the same time preventing entrance of dirt.

(8) The provision of an improved end plate construction and supporting means therefor, whereby all vertical and transverse movements of the plate are prevented while at the same time permitting ready longitudinal movement thereof so that installation or removal of the end plate is in no wise complicated.

(9) The provision of a lubricator construction in which the various parts are always properly positioned when assembled, even though unskilled labor be employed.

(10) The provision of a construction in which the load of the axle is carried entirely by the spreader, so as to prevent all possibility of distorting the cellar.

How the foregoing objects, together with such other objects as may appear hereinafter or are incident to my invention are attained, is illustrated in preferred form in the accompanying drawings, wherein—

Figure 2 is a vertical cross section on the line 2—2 of Figure 3 but including the journal, the perforated plate and the grease cake;

Figure 3 is a horizontal section on the line 3—3 of Figure 2 but omitting the journal, the perforated plate and the grease cake;

Figure 1:
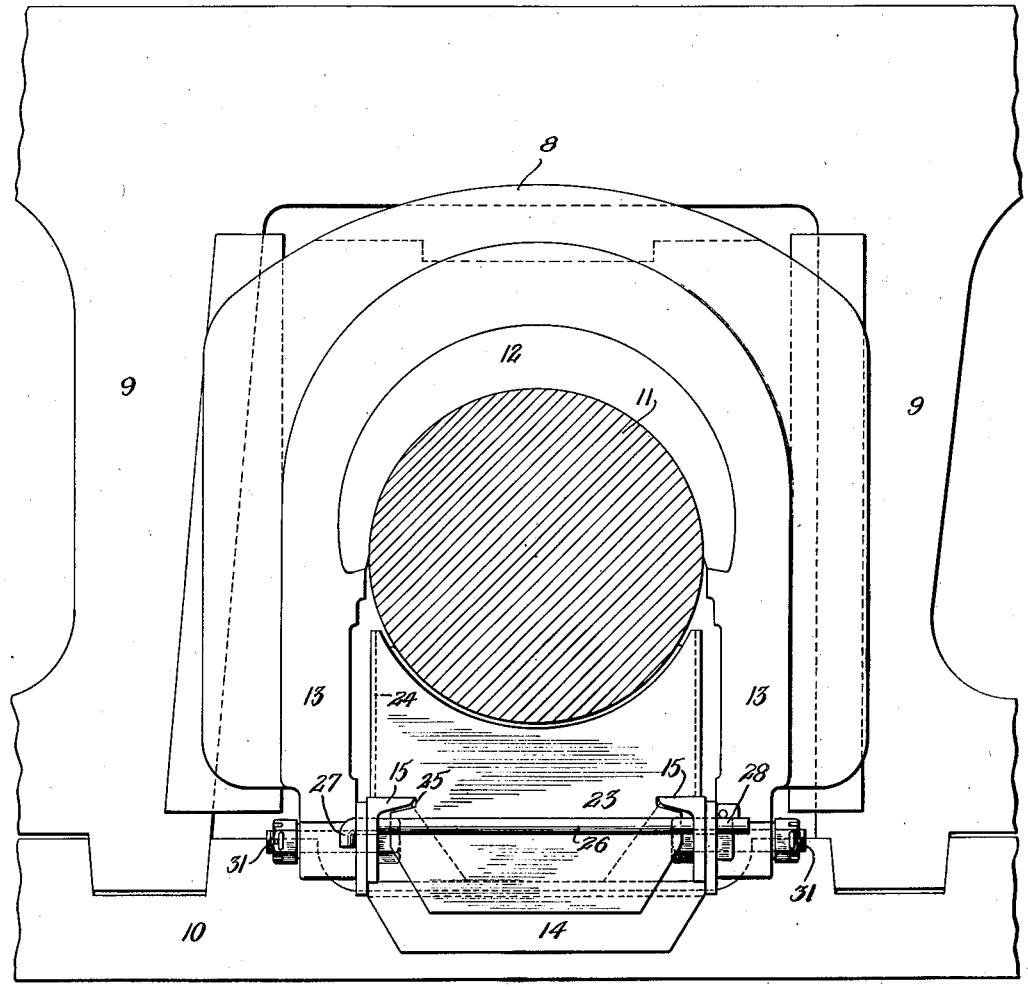
Figure 1 is an end elevation of my improved lubricating equipment in position in a locomotive driving box, with the axle shown in section.
Figure 6:
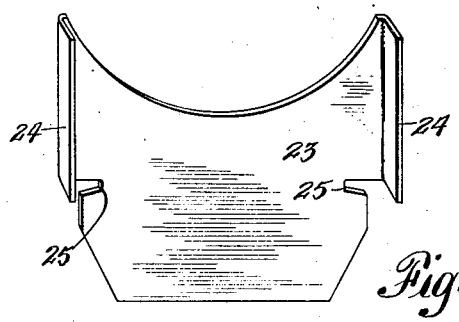
Figure 6 is a perspective view of the improved end plate used with my invention.

The drawings show a locomotive driving box 8 mounted between the pedestals 9 beneath which latter is the customary pedestal binder 10. The axle 11 is provided with a crown bearing 12, and between the sides 13 of the box is mounted the spreader 14 which latter is preferably of the type shown in the co-pending application of Edgar Washburn, Serial No. 244,030, filed December 5, 1938, now Patent No. 2,187,716. This type of spreader, among other things, provides the inwardly extending horizontal flanges 15 upon which my improved cellar 16 is adapted to rest.

Figure 4:
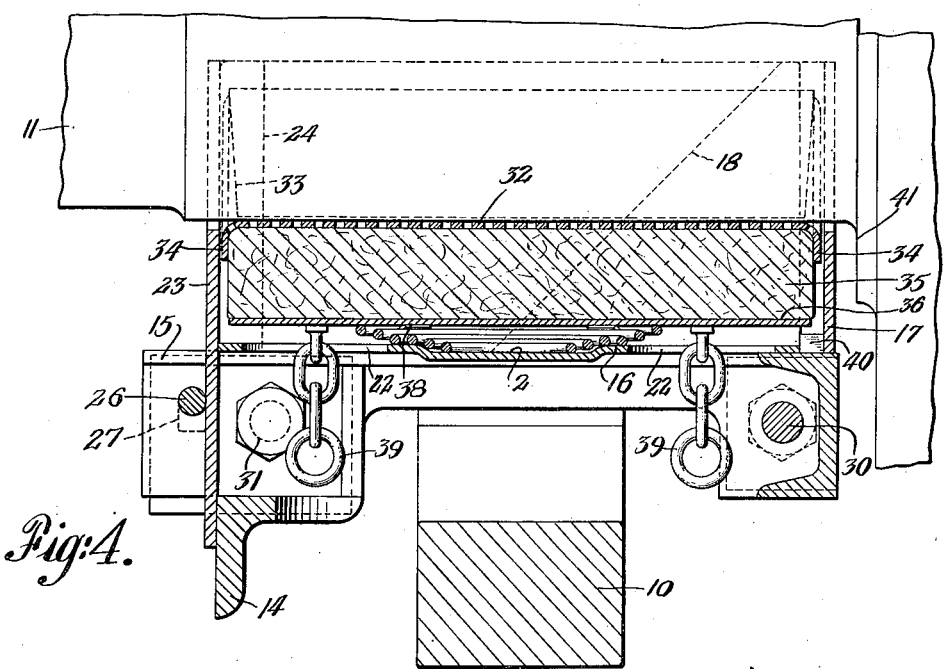
Figure 4 is a longitudinal vertical section on the line 4—4 of Figure 2.
Figure 5:
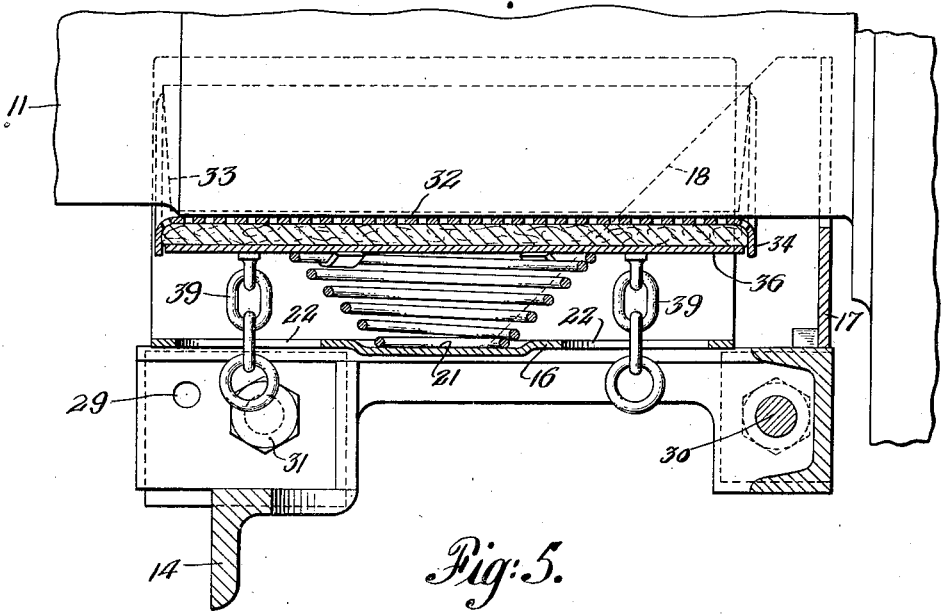
Figure 5 is a view similar to Figure 4 but showing the grease cake after it is substantially consumed, and illustrating the lubricator parts partially removed for the purpose of refilling.

At its outer end, i. e., the end away from the center of the locomotive, the spreader is provided with the upstanding end plate 17, the upper edge of which is suitably curved to conform to the contour of the journal 11. At each end of this plate 17 there is provided a longitudinally extending side brace plate or gusset 18 which tapers downwardly and inwardly, i. e., toward the center of the locomotive, as shown to best advantage in Figures 4 and 5, the lower ends of these gussets extending inwardly along the top of the flanges 15 to a point which is preferably somewhat beyond the longitudinal center of the lubricator.

I prefer to stamp the end plate 17 and the bracing gussets 18 from rolled steel stock. This can be done from a single piece of steel which is subsequently bent to shape and then welded to the spreader or, if desired, the plates 17 and 18 can be separately fabricated and afterwards welded together and in place. By so doing I can obtain the greatest possible strength with the minimum possible weight, and also with the least possible thickness of metal. In this way I am enabled to provide the largest possible cellar space for any given size journal, the cellar of course fitting between the gussets 18 and being guided thereby.

By making the spreader with its plates in the manner described it is possible to use a given size spreader with a number of sizes of journal simply by fabricating the plates 17 and 18 to the required width for the journal in question and then welding them to the standard spreader. It is obvious, of course, that this procedure makes it possible to reduce the number of sizes which it is necessary to carry in stock.

Figure 7:
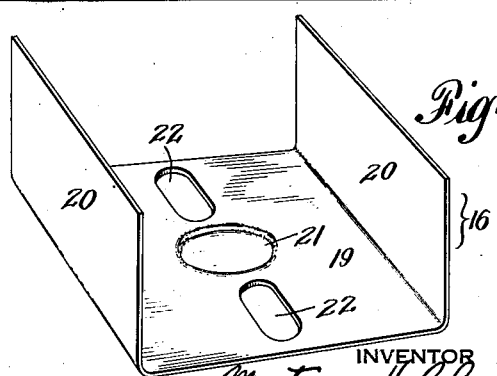
Figure 7 is a perspective view of the improved cellar employed in my invention.

The cellar itself is also preferably stamped in a single operation from a sheet of rolled steel stock, and as most clearly shown in Figure 7, it comprises a bottom portion 19 and two upstanding side portions 20, the bottom portion 19 having formed therein at the same time, the depressed spring-positioning pocket 21 and the two elongated openings 22, one at each side. The ends of the cellar are open and the openings 22 are symmetrically arranged with respect to the depression 21 and the open ends, so that the cellar is reversible end for end. This avoids all possibility of a careless workman inserting the cellar in the wrong position.

At the inner end a retaining end closure plate 2 is provided, the upper edge of which is also curved to conform to the journal, and the sides 24 of which are formed as vertically extending flanges which project toward the opposing gussets 18. These flanges 24 embrace the inner end of the cellar and serve to properly position the same. Just below the vertical flanges 24 the plate 23 is provided at each side with a horizontally extending slot 25, which slots are adapted to embrace the adjacent flange 15 of the spreader, as clearly shown in Figure 1. The slots 25 positively prevent all up and down and transverse movements of the plate 23 while at the same time permitting ready longitudinal movement along the flanges 15 so that the plate can be easily installed or removed. After installation the plate is held in position by means of a pin or rod 26, one end of which is bent over as at 27, and the other end of which is provided with a slot and key construction 28. The rod of course passes through suitable apertures 29 in the sides of the spreader. This closure plate is also preferably made as a stamping and is of uniform thickness throughout—a great advantage in simplicity of manufacture. This type of fabrication affords opportunity to provide the closure plate with strengthening ribs or other reinforcing sections without destroying the uniformity of metal thickness.

Incidentally the outer end of the spreader is held in position between the sides 13 of the driving box by means of a long bolt 30 extending all the way across, while at the inner end there is a short bolt 31 at each side. This of course forms no part of the present invention, but is mentioned so that the drawings may be fully understood.

Within the cellar is the customary perforated plate 32 having the down turned sides 33 and the down turned end flanges 34, the latter being cut or serrated, as shown, to facilitate manufacture in a manner familiar in this art. Below the perforated plate is a grease cake 35 supported upon the follower plate 36, which is yieldingly urged upwardly by the spring 37, the lower end of which rests in and is positioned by the spring-positioning pocket 21. The upper end of the spring is secured to the bottom of the follower plate by means of suitable clips 38.

An indicator chain 39 may be secured to the under face of the follower plate at each end thereof in position to project downwardly through the elongated openings 22. When the indicator chain occupies the position shown for example in Figure 4, the observer knows that the grease cake is substantially intact, whereas when it occupies the position indicated in Figure 5 it will be known that the grease cake is substantially consumed and requires replacement. These indicator chains 39 may be spaced longitudinally of the follower plate 36 in any desired position, so as to clear the pedestal binder 10 the position of which may vary in different installations. It will be seen, therefore, that my improved construction avoids the necessity of carrying a plurality of cellars with different hole locations, as has been customary heretofore where the openings were round rather than elongated.

At the base of the end plate 17 I provide a pair of suitable stop lugs 40 against which the outer end of the cellar is adapted to abut. This ensures proper positioning of the cellar with its grease cake and perforated plate so as to preserve the necessary freedom of motion of these parts during operation. At the same time the cellar with the grease cake and its perforated plate can be moved as close as it is possible to move them toward the hub 41 of the wheel. This ensures adequate lubrication of the hub face, because the grease, as it is melted by the heat of operation, is carried over the short distance remaining.

In conclusion, I wish to refer to the many advantages incident to my invention. The provision of a construction employing rolled sheet stock for the lubricator, the end closure plate, the upstanding end plate on the spreader and the bracing gussets therefor, makes possible a marked increase in the grease capacity of the lubricator with a remarkable decrease in total weight, without any sacrifice of strength. The thickness of the sheet stock parts is materially less than would be possible with the cast construction familiar to the art. Indeed, with my invention it is quite feasible, if desirable, to make the cellar of even lighter material than sheet steel, such for example as sheet aluminum, because there is absolutely no distorting pressure of any kind delivered to the cellar. As typical of the decrease in weight which is possible with my invention, I need only refer to the fact that the sheet steel cellar 16 of my invention will weigh in the neighborhood of ten pounds as against fifty-three pounds for the old style cast steel cellar. The end closure plate 23 is also much lighter in weight, my improved sheet steel type weighing in the neighborhood of five pounds as against an average of about fifteen pounds for previous cast plates.

This reduction in the size of the walls makes possible a substantial increase in the size of the grease cake which can be employed, and also brings the outer end of the grease cake closer to the hub face 41 of the wheel, so that better lubrication is afforded. This advantage of increase in grease capacity is particularly important with many types of installations, where, at best, only a small grease cake can be employed.

Furthermore, the entire load of the axle and its associated parts is very easily carried by the end plate 17 and the closure plate 23 of my invention at times when the locomotive is lifted. This avoids all possibility of crushing or distorting the cellar and lubricator parts proper.

The decrease in weight also makes for much improved heat dissipation, which is an important factor particularly in high speed operation. With previous cast equipment the parts were of such mass as to hold the heat sufficiently to melt the grease cake far beyond what was necessary to effect adequate lubrication. This of course was wasteful and the difficulty is completely overcome with my improvement.

The heat dissipation is also improved with my invention because of the greater edge area in proportion to the mass or body of the parts. It is a well known fact that heat is more quickly dissipated from the end or edge areas than it is from the faces of the parts, and with my open ended lubricator the edge area is greatly increased over the edge area of the old style cast cellar.

Manufacture is greatly simplified and cheapened, and far greater uniformity of material is made possible with my invention than was possible with the old style cast construction. Furthermore, rejects for imperfections in the casting operation are completely eliminated.

Another marked advantage incident to the use of my invention resides in the fact that manufacture of lubricators from sheet steel stock yields the equivalent of machined surfaces so as to ensure uniform and accurate clearances, without however incurring the cost or trouble of machining the parts.

The feature of reversibility of the cellar is also a very marked advantage not only because it avoids all possibility of inserting the cellar incorrectly, but also because it makes unnecessary the carrying in stock of several or more types of cellar, as is now the practice among the railroads where problems of varying clearances have to be met.

Another important advantage of reversability resides in the fact that the grease cake with its perforated plate can be changed end for end so as to insure more uniform consumption of the grease. It is well known that the grease cakes are generally consumed much more rapidly at the hub end than at the other end, probably because of a greater concentration of heat at the hub end. This results in wearing the grease cake to wedge shape and has necessitated periodic repacking at the hub end, a process which is messy, troublesome and time consuming. With my invention this can be avoided by simply reversing the cellar unit periodically so as to insure more uniform consumption at both ends.

The cellar is definitely and quickly centered in proper position by virtue of the guiding effect of the gussets 18 on the spreader and the vertical flanges 24 on the end closure plate. All lateral play is avoided and the end plate is firmly held against all up and down motion as well as sidewise motion.

Many other advantages will occur to those skilled in this art.

I claim:

1. In lubricator equipment for the driving box of a locomotive driving axle, a spreader having an upstanding end wall, a bracing gusset plate at each end of said upstanding wall, a closure plate carried by the spreader and having a flange at each side extending toward the opposed gusset plate, and a symmetrical, open-ended cellar fitting between the gusset plates and the flanges of the closure plate.

2. The structure of claim 1 wherein the spreader end wall, the gusset plates, the closure plate with its flanges, and the cellar are all stamped from rolled steel stock.

3. In locomotive axle driving box lubricator equipment, a spreader having an inwardly extending flange at each side, an upstanding end wall on the spreader, a gusset plate between the end wall and each of said inwardly extending spreader flanges, an end closure plate having a horizontal slot at each side adapted to embrace the adjacent spreader flange and also a vertical flange at each side extending toward the opposed gusset plate, and a symmetrical, open-ended cellar fitting between the gusset plates and the vertical side flanges of the closure plate, said spreader end wall and said closure plate being adapted to support the axle when the locomotive is lifted.

4. In lubricator equipment for the driving box of a locomotive driving axle, a spreader having an inwardly extending flange at each side, and an end closure plate having a slot at each side adapted to embrace the adjacent spreader flange, said slots being adapted to permit longitudinal sliding movement along the spreader flanges while at the same time holding said plate against vertical and transverse movements with respect to the spreader.

5. An end plate for driving box lubricators, said plate having each side edge provided with a horizontal spreader engaging slot and a vertical cellar positioning flange.

MONTAGUE H. ROBERTS.